May 29, 1962     I. LEIBSON ET AL     3,037,011
POLYMER PURIFICATION
Filed Dec. 17, 1958
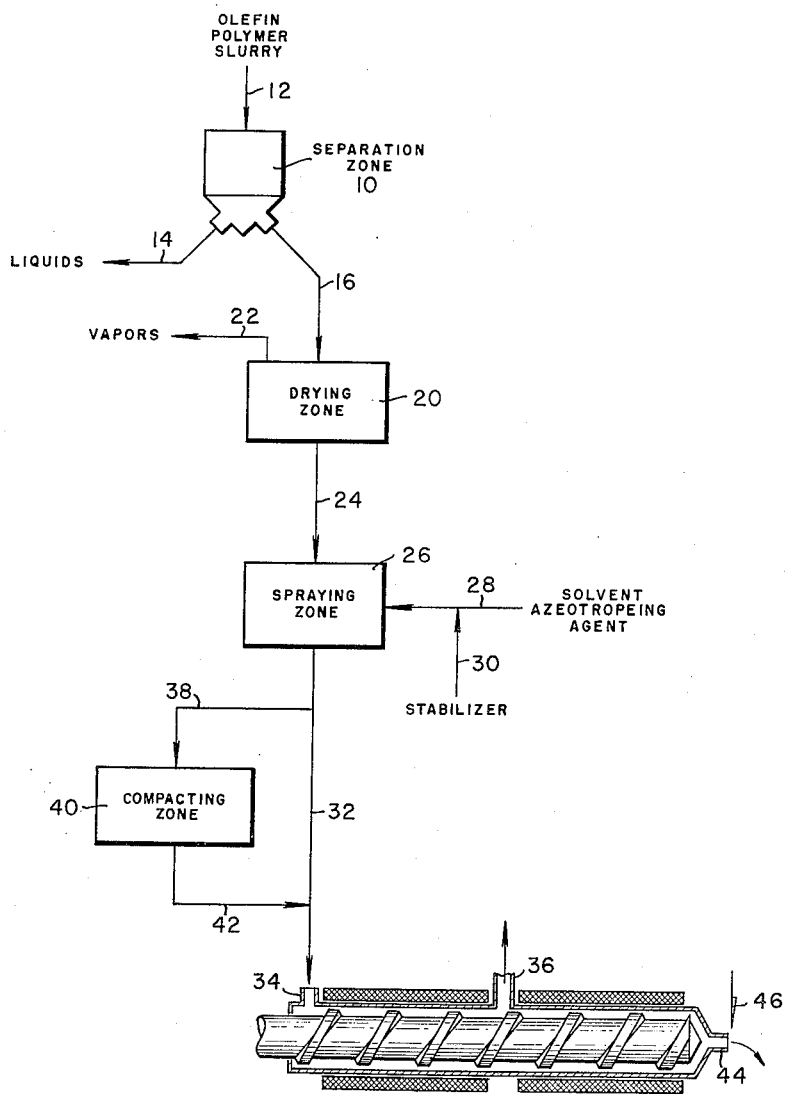
INVENTORS.
IRVING LEIBSON,
HENRY G. SCHUTZE,
BY
ATTORNEY.

United States Patent Office 3,037,011
Patented May 29, 1962

3,037,011
POLYMER PURIFICATION
Irving Leibson and Henry G. Schutze, Baytown, Tex., assignors, by mesne assignments, to Esso Research and Engineering Company, Elizabeth, N.J., a corporation of Delaware
Filed Dec. 17, 1958, Ser. No. 781,127
8 Claims. (Cl. 260—93.7)

This invention relates to a method for the preparation of purified alpha olefin polymers. More particularly, this invention relates to a method for the finishing of polymers of alpha olefin in a manner to remove odor-forming materials.

Alpha olefins such as $C_2$ to $C_6$ alpha olefins may be polymerized under moderate polymerization conditions in the presence of anionic type polymerization catalysts in order to provide high molecular weight polymers. The alpha olefin polymer prepared in this fashion may be a homopolymer or interpolymer of an alpha olefin such as ethylene, propylene, butane-1, pentene-1, isoprene, etc.

The polymerziation reaction is normally conducted in the presence of a non-polar organic diluent. The diluent may be an aromatic hydrocarbon such as benzene, xylenes, toluene, etc.; a paraffinic hydrocarbon such as hexane, heptane, octane, etc.; a naphthenic hydrocarbon such as cyclohexane, methylcyclohexane, decalin, etc.; a halogenated hydrocarbon such as chlorobenzene, ortho-dichlorobenzene, etc., or a suitable mixture of two or more such diluents.

Anionic type polymerization catalysts such as anionic stereospecific polymerization catalysts may be prepared by the partial reduction of an amphoteric metal compound such as a halide, an oxyhalide, acetonate, etc. of an amphoteric heavy metal such as titanium, zirconium, tin, vanadium, chromium, etc. The amphoteric metal compound may be partially reduced with a reducing agent such as an aluminum alkyl, an alkali metal hydride, alkyl metal hydride, etc. Polymerization catalysts of this nature may be liquid but generally are of a solid nature under the polymerization conditions employed.

At the end of the polymerization reaction, it is therefore normally necessary to solvate the catalyst components in order to permit separation of the olefin polymer from at least the bulk of the polymerization catalyst contaminants. The saturating (i.e., quenching) agent may be aliphatic alcohol such as methanol, ethanol, isopropyl alcohol, etc.; an ether such as diethyl ether, di-n-butyl ether, etc.; a ketone such as acetone, methylethyl ketone, etc. Deashing aids such as acetylacetone, $\alpha$-nitroso-$\beta$-naphthol, disalicylethylenediamine, hydroxyquinoline, etc. may also be added during the solvation step.

Thereafter, the resultant slurry is resolved into a liquid fraction and a "solids" fraction by any suitable means such as filtration, decantation, centrifugation, etc. Normally, however, the solid material recovered during the separation step will still contain large amounts of liquid which are not readily removable by physical separation means. Thus, for example, 2 pounds of liquid per pound of solid may be contained in the solid polymer fraction. Normally, it is necessary to subject the "solid" material to a drying operation in order to remove the liquid material by volatilization. Rotary driers, spray driers, etc. may be utilized for this purpose.

After being dried, the polymer is finished in any suitable manner (e.g., by extrusion) in order to provide a low surface area finished product.

Unfortunately, polymers prepared in this fashion are frequently characterized by an objectionable odor which materially impairs the utility thereof.

It has been discovered, in accordance with the present invention, that the odor associated with finished polymers is largely attributable to trace quantities of the diluent initially employed in the polymerization step, such trace quantities of material being present in the final polymer either because of adsorption by the polymer or because of solvation in the polymer, or both.

It has been further discovered that this problem may be overcome by adding an odorless diluent oxygen-containing azeotroping compound in an effective amount to the separated and at least partially dried polymer prior to the terminal devolatilization thereof in order that the odor-forming materials may be removed as a low boiling azeotrope with the azeotroping compound.

The invention will be further illustrated in connection with the accompanying drawing which is a schematic flow sheet illustrating the preferred mode of the present invention.

Turning now to the drawing, there is shown a separation zone 10 which may be a decantation zone, a filtration zone, or a centrifugation zone. In the drawing, the zone 10 is illustrated as a centrifugation zone. A slurry of a high molechlar weight polymer of an alpha olefin in a liquid medium comprising polymerization diluent, solvated catalyst, residue, quenching agent, chelating agent, etc. is charged to the separation zone by way of a line 12. The liquid components of the slurry are withdrawn from the zone 10 by way of a discharge line 14 for discard or recovery in any desired manner.

The solid component of the slurry which may contain large amounts of entrained liquid is discharged by way of discharge line 16 leading to a drying zone 20 such as a spray drying zone, a rotary drying zone, etc. Within the drying zone 20, the polymer is heated to a temperature which is below the softening temperature of the polymer (to prevent excessive agglomeration of polymer particles) and preferably above the boiling point of the liquid components in order to volatilize such liquid components for removal through a vapor discharge line 22. For example, a drying temperature of about 170° to 180° F. may be used.

In accordance with the present invention, the dried polymer is discharged from the zone 20 by way of the line 24 leading to a spraying zone 26 of any desired construction.

Within the spraying zone 26, the dried polymer is sprayed or otherwise intimately admixed with an azeotroping agent for residual liquids present in the dried polymer due to adsorption or solvation. The azeotroping agent is added by way of a line 28. If desired, stabilizers for the polymer may also be added at this time by way of a line 30 for incorporation into the polymer.

The amount of azeotroping agent to be added should be sufficient to remove the residual quantities of liquid material but not such as to materially interfere with further processing of the polymer. Thus, for example, from about 0.01 to 3.0 weight percent of the azeotroping agent, with a preferred range of 0.1 to 1.5 weight percent, based on the weight of the charge material in the spraying zone, may be employed.

The chemical identity of the azeotroping agent may vary widely. Since tables of azeotroping agents are widely available to those skilled in the art (see, for example, Horsley and Co-Workers, "Azeotropic Data," Advances in Chemistry, Series No. 6, June 1952, American Chemistry Society), no particular purpose would be served in listing large numbers of such azeotroping agents inasmuch as the azeotroping agent to be used will be dependent upon the particular material to be removed from the polymer.

It is important, of course, that the agent to be used azeotrope with the odor-forming compound (e.g., polymerization diluent) to form an azeotrope having a boiling point significantly below the melting point of the polymer (e.g., an azeotrope boiling point of not more than about 150° C. and within the range of about 90° to about 150° C.). Further, the azeotroping agent should not be an odor-impairing compound and should be chemically stable.

By way of specific example, however, in the situation where the olefin that is polymerized is propylene and the diluent that is utilized in the polymerization zone is metaxylene, the oxygen-containing azeotroping agent may be water, ethylene glycol, butanol, formic acid, acetic acid, etc. and mixtures of two or more agents to form ternary, quaternary, etc. azeotropes. For example, when the diluent is metaxylene, the mixture of azeotroping agents may include mixtures of water or ethylene glycol with butanol, acetic acid, formic acid, etc.

After incorporation of the azeotroping agent in the zone 26, the resultant mixture is discharged by way of a line 32 leading to a suitable finishing zone illustrated in the drawing as an extruder 34 provided with a vent 36.

If desired, the material removed from the spraying zone 26 may be routed by way of a branch line 38 to a compacting zone 40 for partial compaction (e.g., partial pelleting) prior to re-introduction into the charge line 32 by way of compacting zone discharge line 42.

Within the extruder 34, the alpha olefin polymer is heated to a temperature sufficient to liquefy the same and the melted polymer is thereafter extruded and formed into pellets. By way of specific example, an isotactic polymer of propylene may be heated to a temperature of about 170° C. in the extruder 34 in order to liquefy the polymer. Residual gases in the polymer including the azeotroping agent and polymer diluent will be vented to the line 36. The thus-degassed molten polymer may be extruded through an orifice 44 cooled by any suitable means (not shown) and cut into pellets by means of a suitable pelleting device such as a chopper 46.

Having described our invention, what is claimed is:

1. In a process wherein a $C_2$ to $C_6$ alpha olefin is polymerized in an odoriferous hydrocarbon diluent selected from the group consisting of aromatic, paraffinic, naphthenic, and halogenated aromatic hydrocarbons in the presence of an anionic polymerization catalyst to provide a high molecular weight solid alpha olefin polymer and wherein the solid polymer is separated from the diluent and subjected to a drying operation at a temperature of about 170° to 180° F. and below the softening temperature of the solid polymer, the improvement for removing trace quantities of said odoriferous diluent from said dried solid polymer which comprises adding to and intimately admixing with the dried solid polymer an azeotropically effective amount of an odorless liquid forming an azeotrope with the said diluent in said dried solid polymer, said odorless liquid being a chemically stable oxygen-containing compound, said azeotrope boiling within the range of about 90° to about 150° C. and below the melting point of said solid polymer and thereafter melting said solid polymer while extruding same at a temperature above the boiling range of said azeotrope to effectuate removal of said azeotrope of said azeotroping agent together with said residual quantities of said diluent during said extrusion, said oxygen-containing compound being added in an amount within the range of about 0.01 to 3.0 weight percent based on the weight of the solid polymer.

2. A process as in claim 1 wherein the alpha olefin is propylene and the polymer has a melting point of about 170° C., the diluent is an aromatic hydrocarbon and the azeotroping agent is water.

3. In a process wherein a $C_2$ to $C_6$ alpha olefin is polymerized in an odoriferous hydrocarbon diluent selected from the group consisting of aromatic, paraffinic, naphthenic, and halogenated aromatic hydrocarbons in the presence of an anionic polymerization catalyst to provide a high molecular weight solid alpha olefin polymer, wherein the solid polymer and diluent are treated with a polar active solvating agent for components of the catalyst, and wherein the solid polymer is separated from the diluent and subjected to a drying operation at a temperature of about 170° to 180° F. and below the softening temperature of the solid polymer, the improvement for removing trace quantities of said odoriferous diluent from said dried solid polymer which comprises adding to and intimately admixing with the dried solid polymer an odorless liquid forming an azeotrope with the said diluent in said dried solid polymer, said azeotrope boiling within the range of about 90° to about 150° C. and below the melting point of said solid polymer, said odorless liquid being a chemically stable oxygen-containing compound, thereafter melting said solid polymer while extruding same at a temperature above the boiling range of said azeotrope to effectuate removal of said azeotrope of said azeotroping agent together with residual quantities of said diluent during said extrusion, said azeotroping agent being added in an amount within the range of about 0.01 to 3.0 weight percent.

4. A process as in claim 3 wherein melting of said thus-treated polymer is accomplished by heating in an extrusion zone.

5. A process as in claim 4 wherein said polymer is at least partially pelleted prior to heating in said extrusion zone.

6. A process as in claim 3 wherein the alpha olefin is propylene and the polymer has a melting point of about 170° C., the diluent is an aromatic hydrocarbon, the treating agent is an aliphatic alcohol and the azeotroping agent is selected from the group consisting of water, ethylene glycol, butanol, formic acid, and acetic acid.

7. In a process wherein a $C_2$ to $C_6$ alpha olefin is polymerized in a solution of xylene in the presence of an anionic polymerization catalyst to provide a high molecular weight solid alpha olefin polymer, wherein the polymer and xylene are treated with methanol to solvate the components of the catalyst, and wherein the polymer is separated from the xylene and subjected to a drying operation at a temperature of about 170° to 180° F. and below the softening temperature of the polymer, the improvement for removing trace quantities of xylene from the dried polymer which comprises adding to and intimately admixing with said dried polymer an azeotropically effective amount of water and thereafter melting said polymer while extruding same at a temperature above the boiling point of said azeotrope to effectuate removal of an azeotrope of said water together with residual quantities of said xylene, said water being added in an amount within the range of about 0.01 to 3.0 weight percent, based on the weight of the polymer.

8. A method as in claim 7 wherein the alpha olefin is propylene.

References Cited in the file of this patent
UNITED STATES PATENTS

| | | |
|---|---|---|
| 2,691,647 | Field et al. | Oct. 12, 1954 |
| 2,832,759 | Nowlin et al. | Apr. 29, 1958 |
| 2,838,477 | Roelen et al. | June 10, 1958 |
| 2,868,771 | Ray et al. | Jan. 13, 1959 |
| 2,870,113 | Jones | Jan. 20, 1959 |
| 2,905,658 | Dietz | Sept. 22, 1959 |
| 2,915,514 | Denkowski | Dec. 1, 1959 |
| 2,953,555 | Miller et al. | Sept. 20, 1960 |